US006280879B1

(12) United States Patent
Andersen et al.

(10) Patent No.: US 6,280,879 B1
(45) Date of Patent: Aug. 28, 2001

(54) ELECTRODE/CURRENT COLLECTOR, LAMINATES FOR AN ELECTROCHEMICAL DEVICE

(75) Inventors: Torben Paarup Andersen, Odense SV; Jens Lindbjerg, Odense V; Steen Yde-Andersen, Odense S, all of (DK)

(73) Assignee: Danionics A/S, Odense S (DK)

( * ) Notice: Subject to any disclaimer, the term of this patent is extended or adjusted under 35 U.S.C. 154(b) by 0 days.

(21) Appl. No.: 09/117,373

(22) PCT Filed: Jan. 27, 1997

(86) PCT No.: PCT/DK97/00036

§ 371 Date: Dec. 3, 1998

§ 102(e) Date: Dec. 3, 1998

(87) PCT Pub. No.: WO97/27635

PCT Pub. Date: Jul. 31, 1997

(30) Foreign Application Priority Data

Jan. 25, 1996 (DK) .................................................. 0084/96

(51) Int. Cl.[7] ...................................................... H01M 4/64
(52) U.S. Cl. ........................ 429/233; 29/623.3; 29/623.5; 427/123
(58) Field of Search ........................... 429/233; 427/123; 29/623.3, 623.5

(56) References Cited

U.S. PATENT DOCUMENTS

| | | |
|---|---|---|
| 2,688,649 | 9/1954 | Bjorksten . |
| 3,006,980 | 10/1961 | Story . |
| 3,951,688 * | 4/1976 | Pankow et al. ....................... 141/1.1 |
| 4,519,425 * | 5/1985 | Seidel ................................... 141/1.1 |
| 4,935,317 | 6/1990 | Fauteux et al. ...................... 429/192 |
| 5,227,223 | 7/1993 | Morgan et al. ....................... 428/209 |
| 5,916,628 * | 6/1999 | Ueyama et al. ...................... 427/115 |
| 5,916,632 * | 6/1999 | Mishina et al. ....................... 427/240 |

FOREIGN PATENT DOCUMENTS

| | | |
|---|---|---|
| 0 411 949 A1 | 2/1991 | (EP) . |
| 0602976 A1 | 6/1994 | (EP) . |
| 83002 | 1/1991 | (FI) . |

OTHER PUBLICATIONS

Gordon Bierwagen (1992) *Film Coating Technologies and Adhesion*, pp. 1471–778, Electrochimica Acta, vol. 37, No. 9.

Patent Abstracts of Japan, vol. 16, No. 91, E–1174, abstract of JP, A, 3–272562 (Yuasa Battery Co. Ltd.), Dec. 4, 1991 (04.12.91).

* cited by examiner

*Primary Examiner*—Laura Weiner
(74) *Attorney, Agent, or Firm*—Darby & Darby (57) ABSTRACT

The invention relates to a cheap and fast method for the production of electrode/current collector laminates, the electrode layer having a thickness of at least 20 $\mu$m. The current collector foil is provided with an electrode paste coating on at least one of its sides by filling paste into the cells or grooves of a patterned matrice roll; transferring paste from the matrice roll onto the current collector foil by a printing operation involving contacting the matrice roll and the current collector foil or alternatively contacting the matrice roll with an offset roll which in turn is in contact with the current collector foil; drying the layer of paste printed onto the current collector; and optionally repeating the process until the desired thickness of the electrode layer is obtained. The invention also relates to a gravure roll and a primer-coated current collector foil for use in the method, a primer paste for the production of primer-coated current collector foils and an electrode paste for the production of electrode/current collector laminates.

22 Claims, 2 Drawing Sheets

FIG. 1

ELECTRODE/CURRENT COLLECTOR, LAMINATES FOR AN ELECTROCHEMICAL DEVICE

The present invention relates to a method for the production of electrode/current collector laminates for an electrochemical device, an electrode paste, a gravure roll and a primer-coated current collector foil for use in the method, a primer paste for the production of primer-coated current collector foils, an electrode paste for the production of electrode/current collector laminates and a gravure roll. The invention furthermore relates to the electrode/current collector laminates produced.

Traditionally, components for electrochemical cells have been bulky and have been produced by mould casting, pressing, punching and rolling techniques.

The increasing demand for high capacity and high power density batteries has resulted in the development of laminar batteries. Such batteries are generally produced by laminating together thin layers of current collectors, electrodes and optionally a mechanical separator. Electrode/current collector components for laminar cells are conventionally produced by pressing, extrusion, pasting or doctor blade coating techniques (see e.g. "Handbook of Batteries", McGraw-Hill, 1995).

U.S. Pat. No. 4,935,317 describes a process for making a solid state laminar cell involving doctor blade coating of a cathode composition layer on a current collector, followed by rolling of the external surface of said cathode composition to provide an external surface having minimal surface discontinuities.

EP 411 949 describes a method for the formation of a thin layer of lithium metal onto a substrate by transferring molten metal, which is projected above the surface of a vessel, to a substrate by directly or indirectly contacting the molten metal with the surface of the metal.

For the production of the thin cell components used in laminar electrochemical systems like lithium polymer batteries and supercapacitors, however, none of the above-mentioned methods are appropriate, since they do not allow for continuous high speed production of components of uniform thickness.

The thickness of the components of laminar electrochemical devices is in the range of 5–200 $\mu$m. Such laminar components should be of uniform thickness, since non-uniformity may lead to a non-uniform resistance distribution over the laminate area, non-uniform current distribution and eventually hot spots and cell failure. Accordingly, these devices call for a manufacturing method which allows the application of layers of uniform thickness. In particular, a need exists for a method for the production of electrode/current collector laminates which allows for application of an electrode layer of uniform thickness on a current collector despite the presence of substrate irregularities.

Rechargeable electrochemical cells, such as lithium polymer batteries, may be manufactured in their charged as well as their discharged state. However, due to the fact that the electrodes of such cells are generally highly reactive in their charged state, charged-state production calls for production conditions involving inert atmosphere, adding significantly to the production costs. Thus, production of electrochemical cells in their discharged state, which do not call for such precautions, is generally desirable.

The electrode/electrolyte interface of laminar electrochemical cells typically consists of a structure including electrode components as well as electrolyte components, intimately mixed to high percolation. This interface structure may be obtained by an in-situ one-step operation, in which a paste containing electrode as well as electrolyte components is applied to a current collector. Due to the hygroscopicity of non-aqueous electrolytes, this operation must be performed in an inert atmosphere.

Following an alternative route of manufacture, however, electrolyte-free electrode/current collector laminates may be produced, which are subsequently impregnated with electrolyte. In this case the part of the manufacturing process, which does not involve the electrolyte, can take place in ambient atmosphere. Electrodes manufactured in this way should display controlled porosity as to allow the subsequent absorption of the electrolyte.

Therefore, although a number of techniques are known for the manufacture of laminar components for electrochemical systems, there still exist a need for a technique, which fulfils the requirements for fast, reproducible manufacture of electrode/current collector laminates of uniform thickness, despite the presence of irregularity of the surfaces of the current collector foil.

It is thus an object of the invention to provide an efficient and economically advantageous method for continuous high speed production of electrode/current collector laminates having an electrode layer of uniform thickness despite the presence of current collector foil irregularities, the thickness of the electrode layer being at least 20 $\mu$m.

This object is accomplished by a method for the production of an electrode/current collector laminate for an electrochemical device, said electrode layer of the laminate having a thickness of at least 20 $\mu$m, wherein said current collector foil of the laminate, optionally coated with a conductive primer, is provided with an electrode paste coating on at least one of its sides, said electrode paste comprises particles of electrode material, a solvent and a binder, said method comprises the step of:

a) filling said paste into the cells or grooves of a patterned matrice roll;

b) transferring paste from the matrice roll onto the current collector foil by a printing operation involving contacting the matrice roll and the current collector foil or alternatively contacting the matrice roll with an offset roll which in turn is in contact with the current collector foil;

c) drying the layer of paste printed onto the current collector; and d) optionally repeating steps a)–c) until the desired thickness of the electrode layer is obtained.

In the present context the expression "electrochemical devices" i.a. encompass batteries, including rechargeable batteries, preferably lithium-polymer batteries, fuel cells, capacitors, including so-called supercapacitors, electromechanical reactors and electrochromic devices here under electrochromic displays, including "smart windows".

Electrochromic displays, which are also referred to as variable transmission windows or smart windows, are transparent electrochromic systems, the colour of which can be controlled upon variation of the applied potential. Those electrochromic displays comprise a working glass electrode, traditionally comprising $WO_3$, which is bleached upon charge and coloured upon discharge and a counter glass electrode. Both of these electrodes are coated onto a transparent current collector layer, traditionally of ITO glass, and sandwiched between said electrodes, is the electrolyte.

It is preferred that the steps a)–c) of the method according to the invention is performed using gravure printing technique.

The gravure printing technique involves transfer of a paste of pigment and/or printing ink from the engraved cells of a gravure roll onto a web, alternatively onto a second roll and subsequently onto a web (offset gravure printing). Traditionally, the conditions of a gravure printing operation involves coating of pastes having a viscosity of 15–1500 mPas at a printing speed of up to 300 m/min. The virtually non-porous coatings obtained typically have a thickness in the range of 1–10 µm.

The gravure printing technique is basically a loading procedure, in which a fixed amount of material is applied on a substrate. The general conditions and measures to be taken to perform gravure printing are e.g. described in Cohen, Edward and Gutoff, Edgar: Modern Coating and Drying Technology, VCH, pp. 103–108 and Leach and Pierce: The printing ink manual, Chapmann & Hall, 1993, pp. 474–546.

Application of gravure printing in other types of battery and capacitor manufacturing processes has been described in the literature:

U.S. Pat. No. 5,227,223 describes the gravure printing of metallic catalytic inks having a very low viscosity (20–50 cp. in the examples) comprising a solution of polymer and a group IB or VIII metal onto a moving web, for the production of electronically conductive components for devices like diodes, capacitors, batteries, sensors and fuel cells. The metallic catalytic ink is printed onto the web in fine lines of a width of e.g. less than 100 µm and a thickness being less than 8 µm (The depth of the image in the gravure roll is less than 80 µm and the content of solids in the ink is not more than 10% by weight).

U.S. Pat. No. 2,688,649 describes the printing of batteries using an ink with suspended magnetic particles, printing said ink in thin lines onto a non-conducting sheet for subsequent orientation of the magnetic particles of the ink in a magnetic field. It is not directly mentioned that the thickness of the layer of magnetic particles is thin, however from the drawings it appears that the magnetic particles is lying in one layer. In other words it may be concluded the thickness of the printed ink is close to the maximal particle size.

U.S. Pat. No. 3,006,980 describes the patterns or laterally spaced thin linear anodes printed onto one side of an electrically non-conductive sheet, and the patterns of parallel, laterally spaced thin linear cathodes printed onto the other side of said electrically non-conductive sheet, the anodes and cathodes, respectively, being connected by a printed linear electrically conductive transverse thin trunk line.

None of these above prior art documents, however, gives any teaching which could lead a skilled person to the solution of the present invention. Particularly it should be observed, that nothing is mentioned about how to provide a conducting collector foil with an electrode layer of a thickness of at least 20 µm which layer substantially having a uniform thickness through out the layer. Also it should be observed that such electrode layers should cover most of at least one side of the current collector optionally leaving one or more edge parts of the current collector foil free of electrode material. The electrode layer preferably covers an area of at least 5×10 mm of the collector foil.

Bierwagen evaluated in Electrochemica Acta Vol. 37 (1992) pp. 1471–8 the use of a number of coating techniques like roll coating, gravure coating, dip coating, bead coating, curtain coating, slide coating, spray coating and spin coating for their potential use in the manufacture of solid polymer batteries. However, Bierwagen was only concerned with the application of these techniques for the coating of solid polymeric electrolyte (SPE) films.

The pattern of the matrice roll may be either uniform or non-uniform. In the present context a uniform pattern is represented by an essentially homogeneous and coherent pattern of cells or grooves on the roll surface. A non-uniform pattern, on the other hand, is represented by a non-homogeneous and/or discontinuous pattern. Thus, a roll having on its surface e.g. two or more engraved domains separated by non-engraved parts, has a non-uniform pattern according to this definition.

The matrice roll is preferably an engraved gravure roll. In this case the electrode paste can be transferred onto the current collector foil either by a direct gravure printing operation or an offset gravure printing operation. The direct gravure printing operation involves introduction of the current collector foil into the nip between a pair of rolls consisting of the engraved gravure roll and a flexible back-up roll. The offset gravure printing operation involves transfer of paste from the gravure roll to an offset roll in contact with the gravure roll and subsequently transfer of the paste from the offset roll to the current collector foil by introduction of the current collector foil into the nip between a pair of rolls consisting of said offset roll and a flexible back-up roll.

Alternatively, the electrode paste can be transferred onto the current collector foil by a flexoprinting operation. Flexoprinting is performed by employing a patterned matrice roll and a flexible rubber roll (the offset roll) having a rastered surface. More specifically, the flexoprinting operation involves transfer of paste from the patterned roll to the rubber roll and subsequently transfer of the paste from the rubber roll to the current collector foil by introduction of the current collector foil into the nip between a pair of rolls consisting of said rubber roll and a flexible back-up roll.

The thickness of the electrode layer in the produced electrode/current collector layer should be relatively high (higher than 20 µm) in order to ensure high electrode capacity and thus high energy and power density of the final electrochemical device. The electrode paste is preferably coated onto the current collector in an amount sufficient to obtain an electrode layer thickness of 20–300 µm in the produced laminate.

This electrode layer thickness may be obtained using a single electrode paste printing operation. Alternatively, one or more, preferably 1–5, subsequent electrode coating operations, in which electrode paste is printed onto the surface of an electrode layer of a previously produced electrode/current collector laminate, followed by drying of the printed electrode paste, may be employed.

The porosity of the produced electrode layer should preferably be relatively high so as to allow for efficient impregnation of the electrode layer with an electrolyte solution. The electrode paste is preferably coated under such conditions as to obtain a porosity of 20–80%, more preferably 30–70%, in the electrode layer of the produced laminate.

When one or more subsequent electrode coating operations are performed, in which electrode paste is printed onto the surface of a previously deposited electrode layer, the paste composition and the employed drying conditions may be different from layer to layer. In this way electrodes displaying a porosity profile (i.e. a varying porosity throughout the depth of electrode) may be produced in a simple manner. The porosity profile can be obtained by coating one or more subsequent electrode layers on top of the first electrode coating, at least one of which has a porosity which differs from the first electrode coating. However, many other electrode porosity profiles can easily be obtained. Advantageously, electrodes displaying an increasing or decreasing porosity as a function of the depth of the electrode may be produced. In a preferred embodiment, electrodes showing a relatively low porosity near the current collector and a relatively high porosity near the upper surface are produced.

The current collector foil should consist of a material which fulfils the demands for high chemical and electrochemical stability, high electronical conductivity, low density and good processability. Furthermore it should provide a good adhesion to layers coated thereon.

According to the invention the current collector foil is preferably a metal foil or a foil of a conductive polymer. Aluminium, copper, nickel and stainless steel are all available as thin foils, displaying a high conductivity. Thus, foils of aluminium, copper, nickel and stainless steel are the most preferred current collectors according to the invention.

In batteries, copper and nickel foils are preferably used as current collectors at the negative electrodes, as they generally are not stable against oxidation at the operational potential of positive electrodes. Aluminium, on the other hand, is preferably used as a current collector at the positive electrode, as aluminium may form alloys with the metalions of the electrolyte salt, e.g. $Li^+$, at low potentials. Alloying not only leads to a loss of active material and loss of potential; the formed alloys, such as lithium-aluminium alloys, are generally porous and of low density, leading to irreversible volume changes and failure of the negative electrode.

In order to alleviate the above-mentioned disadvantages normally associated with current collector foils and to protect the current collector foils from highly reactive and corrosive electrode and electrolyte materials, they are advantageously coated with a dense, conductive primer, prior to the coating of electrode paste. The primer may be based on commercially available products, such as the CL51 screen printing dye from Wiederhold Siebdruckfarben, which are based on carbon black/graphite and thermosettling resins. However, during the course of the research underlying the present invention a particularly advantageous primer has been developed.

Accordingly, the present invention furthermore relates to a primer paste for the production of current collectors having a protective primer layer, said primer paste being composed essentially of 3–30% by weight, preferably 5–20% by weight, of carbon blacks;

0–20% by weight, preferably 0–10% by weight, of graphite;

6–40% by weight, preferably 10–25% by weight, of binder;

40–90% by weight, preferably 50–80% by weight, of solvent; and

0–10% by weight, preferably 1–5% by weight, of auxiliary materials, preferably selected from the group consisting of dispersing agents, defoaming agents and rheological control agents.

The carbon blacks and graphites are preferably selected from highly conductive carbon blacks, preferably having a conductivity of at least 1 $S.cm^-$, and graphites having a low lithium intercalation capability and a lower reactivity toward the electrolyte of the electrochemical device they are intended for.

Furthermore, the carbon blacks preferably display high structure and are advantageously selected from the group consisting of furnace blacks, acetylene blacks and lampblacks. The graphites preferably display particle size of 10 $\mu m$ or less, advantageously in the range of 0.5–5 $\mu m$, preferably 0.5–2.5 $\mu m$.

The binder is advantageously selected from the group consisting of rubber binders, preferably ethylene-propylene-diene-polymethylene (EPDM), ethylene-propylene-polymethylene (EPM) and polyisobutylene (PIB), cellulosederivatives, preferably nitrocellulose (NC), cellulose acetate butyrate (CAB) and cellulose acetate propionate (CAP), resins, preferably indene-coumarone resins and aromatic $C_9$-hydrocarbon resins, fluorocontaining polymers, preferably PVDF and PVDF-copolymers, including PVDF-PE copolymer and PVDF-hexafluoro propylene copolymers, vinyl copolymers, modified vinyl .copolymers, polyacrylates, polyamides, polyur-ethanes, polyisocyanates and blocked polyisocyanates reacted with hydroxylbearing polymers or di- or triamines.

The solvent is preferably selected from the group consisting of $C_5$–$C_{15}$ aliphatic or alicyclic compounds, organic esters of the general formula $R^1C(=O)OR^2$, wherein $R^1$ represents hydrogen or $C_1$–$C_4$ alkyl and $R^2$ represents $C_1$–$C_5$ alkyl, glycol derivatives of the general formula $R^3OCHR^4CH_2OR^5$, wherein $R^3$ and $R^5$ independently represent hydrogen, $C_1$–$C_4$ alkyl or acetyl and $R^4$ represents hydrogen or methyl, alcohols $R^6$—OH, wherein $R^6$ represents $C_1$–$C_4$ alkyl, ketones, DMF, N-methyl-pyrrolidone, dimethylacetamid, DMSO and THF.

The dispersing agent may be non-ionic, anionic, cationic, as well as amphoteric. However, preferably a cationic dispersing agent, such as Deuteron PO100 from W.O.C. Schöner GmbH, is used.

The defoaming agent is preferably a mineral oil or silicone oil defoaming agent, preferably a silicone oil defoaming agent, such as BYK-080 from BYK Chemie.

The rheological control agent is preferably selected from organo clays, silicas and castor oil derivatives, preferably organo clays, such as Viscogel B7 form Chimica Mineraria SpA.

The primer layer may be applied to the current collector using a wide variety of coating/printing techniques. The coating technique used is preferably selected from the group consisting of doctor blade coating, wire bar coating, screen printing, direct gravure printing, offset gravure printing and flexoprinting, more preferably by direct gravure printing or screen printing, even more preferably by direct gravure printing.

The primer layer preferably has a thickness of 1–10 $\mu m$, more preferably 1–5 $\mu m$.

It may be desirable to produce electrode/current collector laminates consisting of a current collector foil onto which electrode layers are coated on both sides of the foil. Such laminates are easily produced by the method of the invention, as the production thereof merely involves a first step in which a first electrode paste is coated onto a first side of the current collector, followed by drying, and a second step in which a second electrode paste is coated onto the opposite side of the current collector, followed by drying, this second electrode paste being identical to or different from the first electrode paste.

The present invention furthermore relates to an electrode paste for use in the method of the invention. This electrode paste comprises an electrode material, binder, solvent and optionally an electronically conductive additive.

The electrode material may consist of any material capable of functioning as the electrochemically active ingredient of a positive or negative electrode of an electrochemical device. When used as an electrode material in a rechargeable battery, it should be capable of being oxidized and reduced in a reversible manner during charge and discharge of the battery. Examples of suitably electrode materials for the production of batteries are:

Positive Electrodes lithium transition metal oxides, preferably lithium manganese oxides, more preferably spinel lithium manganese oxide, vanadium oxides, preferably $V_6O_{13}$ or $VO_2$, lithium cobalt oxides, preferably $LiCoO_2$, and lithium nickel oxides, preferably $LiNiO_2$.

Negative Electrodes

Li-intercalating carbon materials, preferably cokes, carbon blacks and graphites.

The relative amount of electrode material in the paste has a major influence on the energy and power density achieveable from the electrochemical device in which the produced electrode/current collector laminate is used. In general, a low amount of electrode material results in a low energy density. On the other hand, a high amount of electrode material may result in a low power density, owing to reduced access thereto as caused by low porosity and/or low electronical conductivity of the produced electrode layer. The electrode material is preferably present in an amount of 10–60% by weight, more preferably 25–50% by weight, relative to the total weight of the electrode paste.

The electrode paste preferably contains an electronically conductive additive, such as carbon black, in order to enhance electrode conductivity and thus the device power density. This additive is preferably present in an amount of 0–20% by weight, more preferably 2–10% by weight.

The binder loading should be sufficiently high to provide an electrode layer displaying high mechanical integrity during manufacture as well as in the final product. On the other hand it should also be sufficiently low to allow for a high electrode porosity. The binder is preferably present in an amount of 1–20% by weight, preferably 1–10% by weight, relative to the total weight of the electrode paste.

The binder is advantageously selected from the group consisting of rubber binders, preferably ethylene-propylene-diene-polymethylene (EPDM), ethylene-propylene-polymethylene (EPM) and polyisobutylene (PIB), cellulosederivatives, preferably nitrocellulose (NC), cellulose acetate butyrate (CAB) and cellulose acetate propionate (CAP), resins, preferably indene-coumarone resins and aromatic $C_9$-hydrocarbon resins, fluorocontaining polymers, preferably PVDF and PVDF-copolymers, including PVDF-PE copolymer and PVDF-hexafluoro propylene copolymers, vinyl copolymers modified vinyl copolymers, polyacrylates, polyamides, polyur-ethanes, polyisocyanates and blocked polyisocyanates reacted with hydroxylbearing polymers or di- or triamines.

The paste solvent is preferably a low boiling solvent, which is easily evaporated at relatively low drying temperature during manufacture. On the other hand, too fast evaporation may lead to mud cracks and poor coatings. The solvent should preferably have a high solvating power towards the binder, allowing production of highly concentrated pastes.

The solvent is preferably present in an amount of 20–88% by weight, more preferably 30–70% by weight, relative to the total weight of the electrode paste, and is advantageously selected from the group consisting of $C_6$–$C_{15}$ aliphatic or alicyclic compounds, organic esters of the general formula $R^1C(=O)OR^2$, wherein $R^1$ represents hydrogen or $C_1$–$C_4$ alkyl and $R^2$ represents $C_1$–$C_5$ alkyl, glycol derivatives of the general formula $R^3OCHR^4CH_2OR^5$, wherein $R^3$ and $R^5$ independently represent hydrogen, $C_1$–$C_4$ alkyl or acetyl and $R^4$ represents hydrogen or methyl, alcohols $R^6$—OH, wherein $R^6$ represents $C_1$–$C_4$ alkyl, ketones, DMF, N-methyl-pyrrolidone, dimethylacetamid, DMSO and THF.

The viscosity of the electrode paste should be relatively low in order to allow for a high electrode coating thickness and to obtain good levelling properties of the coated paste. The viscosity of the paste at a shear rate of 700 $s^{-1}$ is preferably in the range of 50–1000 mPas. Furthermore, the paste preferably displays pseudoplasticity, i.e. a viscosity which decreases as a function of the shear rate. The paste may even display a thixotropic viscosity profile.

The electrode paste may furthermore contain certain auxiliary materials, such as dispersing agents, defoaming agents and/or rheological control agents, in an amount of 0–20% weight, preferably 1–10% by weight, based on the total weight of the electrode paste. The purpose of such auxiliary materials is to ensure a suitably low paste viscosity despite the relative high loading of electrode material and binder, so as to allow for efficient filling of gravure cells and proper subsequent pick-out of electrode paste, whilst at low shear rates, the paste viscosity remains sufficiently high so as to provide for good adhesion between electrode paste and gravure roll and electrode paste and current collector.

Generally, the presence of dispersing agents and defoaming agents influence the viscosity level at all shear rates and does not cause any significant changes of the curvature of the viscosity profile. In contrast, rheological control agents have a major influence on the curvature of the viscosity profile, and may accordingly be used to adjust the pseudoplastic and/or thixotropic properties of the electrode paste.

Examples of suitable dispersing agents are non-ionic, anionic, cationic, such as Deuteron PO100 from W.O.C. Schöner GmbH, and amphoteric, such as Troysol 98C from Troy Chemical Company, dispersing agents. Preferably a cationic dispersing agents is used.

Examples of suitable defoaming agents are mineral oil and silicone oil defoaming agents, preferably silicone oil defoaming agents, such as BYK-080 from BYK Chemie.

Examples of suitable rheological control agents are organo clays, silicas and castor oil derivatives, preferably organo clays, such as Viscogel B7 from Chimica Mineraria SpA.

In a special embodiment of the method of the invention, it further comprises a step in which a preferably non-aqueous electrolyte is deposited on the electrode layer of a previously produced electrode/current collector laminate. In said further step the electrolyte is preferably deposited by a direct or offset gravure printing operation.

The drying of the electrode paste should preferably be fast in order to obtain a high electrode layer porosity and to allow fast laminate manufacture. However, the solvent evaporation should not be so fast that mud cracks and/or delamination appear. Preferably drying is performed at a temperature of 70–160° C., preferably 70–120° C. The drying preferably takes place in a period of 0.1 to 30 s following the printing operation.

The printing speed can be varied between wide limits. However, the optimal printing speed is a speed close to the critical speed, i.e. the maximum speed at which proper single-line pick-out takes place. Preferably, during the printing operation, the matrice roll is rotated at a frequency corresponding to a speed at the roll circumference in the range of 0.01–300 m/min., preferably 5–200 m/min., more preferably 50–150 m/min.

In general, the thickness of the coated electrode layer will increase with increasing cell depth of the applied matrice roll. For a gravure roll, the amount of coating transferred to the web almost always corresponds to approximately 60% of the cell volume (see e.g. Cohen, Edward and Gutoff, Edgar: Modern Coating and Drying Technology, VCH, pp. 103–108). Preferably a gravure roll having a cell depth in the range of 10–300 µm, more preferably 20–200 µm, even more preferably 50–150 µm, is applied in the method of the invention.

The pitch number of the applied gravure roll should be sufficiently high to provide for good levelling of the coated paste. On the other hand, the pitch number should be chosen so low that unstable multiple-line pick-out is avoided. Preferably, the pitch number is in the range of 4–160 cm$^{-1}$, more preferably 10–100 cm$^{-1}$, even more preferably 10–30 cm$^{-1}$.

At a given volume factor (volume of cells per unit surface area), the land area, i.e. the non-graved area of the gravure roll, should be maximised to sustain proper printing. However, at very high land areas, the levelling process will be hindered. The land to volume ratio should be selected in accordance with the pitch requirements described above.

The cell geometry should allow for the high coating thickness. Angles in the range of 30–80° are applicable as they allow for fast transfer of electrode paste to and from the cells during the printing operation. The cells are preferably provided by a chemical etching process, which typically results in a distribution of cell angles.

Several combinations of blade elasticity, force and contact angle, will allow for printing of the relatively thick coatings. The doctoring blade modulus of elasticity, defined as the ratio of stress (deformation subject to load) and strain (tendency to resume original shape) should be high.

In general, there exists a relation between the applied force and the coating thickness; the higher the applied force, the lower the thickness of the coating. With soft blades, however, the relation may be more complex; at medium force, the coating thickness may be increasing with increasing force, as the tip of the blade is lifted from the gravure roll surface. At low and high forces, the well-known relation of decreasing coating thickness with increasing force exists. The blade loading is increased upon pivoting the base of the blade, i.e. upon increasing the working angle of the blade. Preferably the working angle should be relatively low in order to allow for relative thick coatings.

The invention is described in further detail in the drawing, in which.

Figure 1:
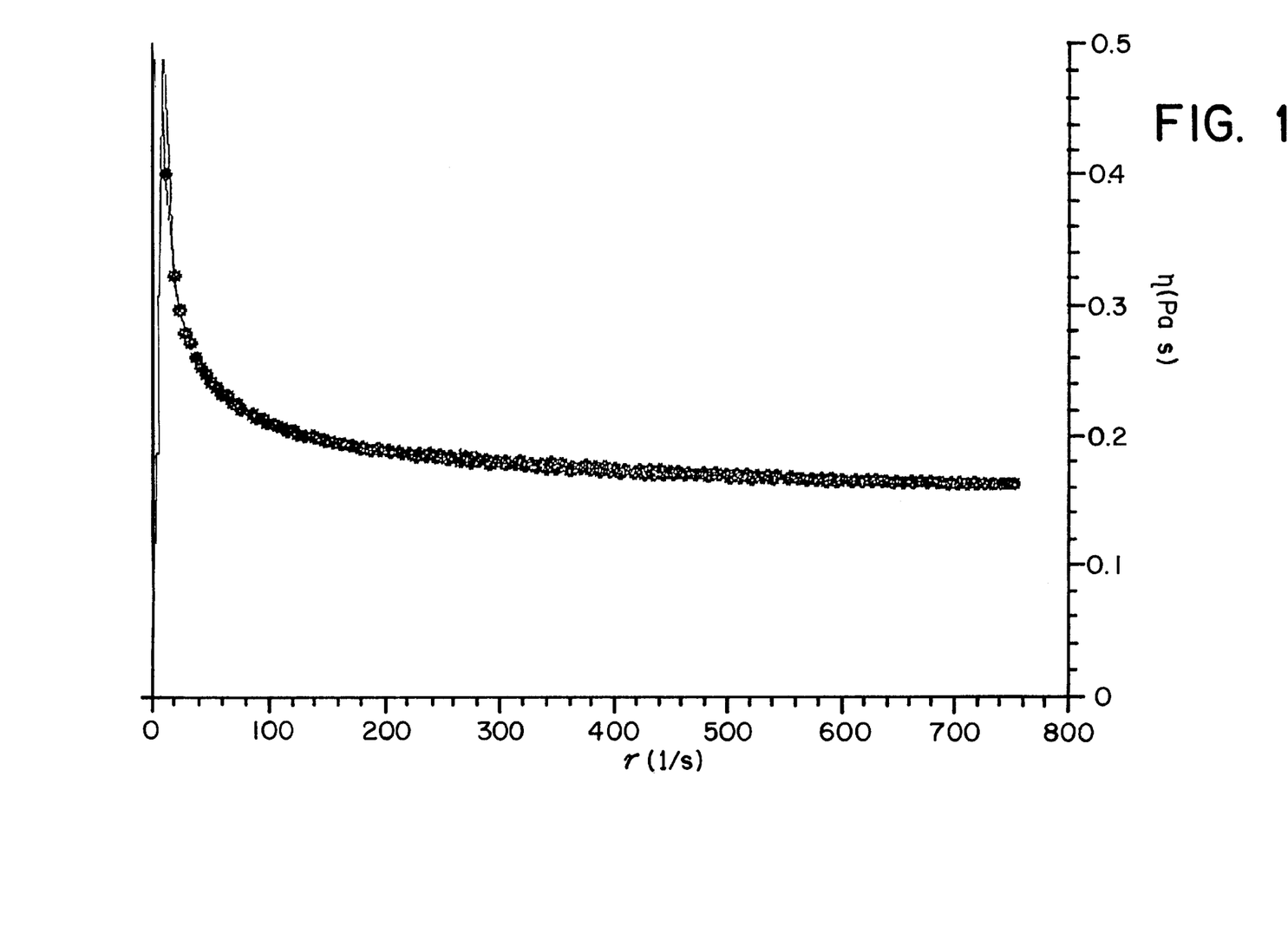
FIG. 1. shows the viscosity as a function of shear rate (i.e. the viscosity profile) for an electrode paste according to the invention.

In FIG. 1 a typical viscosity profile for an electrode paste according to the invention is shown. The viscosity of the paste decreases as a function of shear rate, corresponding to pseudoplastic behaviour.

Figure 2:
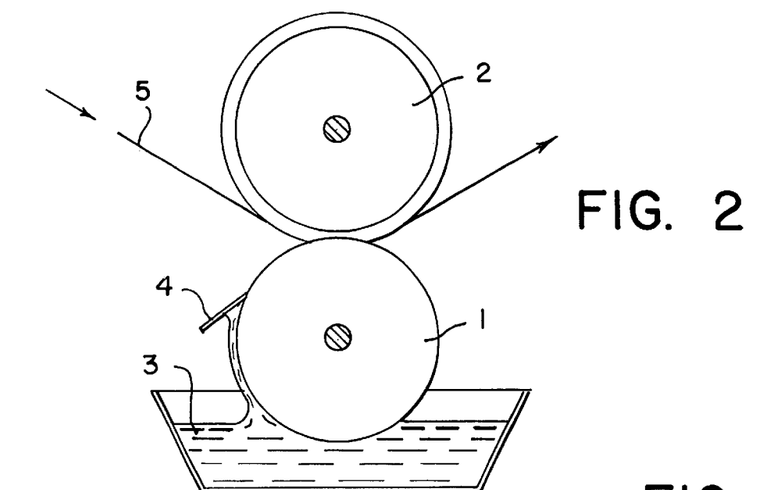
FIG. 2. is a schematic drawing of a direct gravure printing operation involving a single gravure roll set-up.

In FIG. 2 a direct gravure printing operation is shown. The printing apparatus consists of a gravure roll (1) and a flexible, rubber-covered back-up roll (2). Electrode paste (3) is applied to the gravure roll, followed by scrabing off the excessive amount of electrode paste by a doctor blade (4). A current collector film (5) is introduced into the nip formed by the gravure roll (1) and the back-up roll (2), whereby electrode paste is picked out of the cells of the gravure roll to form a layer on the current collector.

Figure 3:
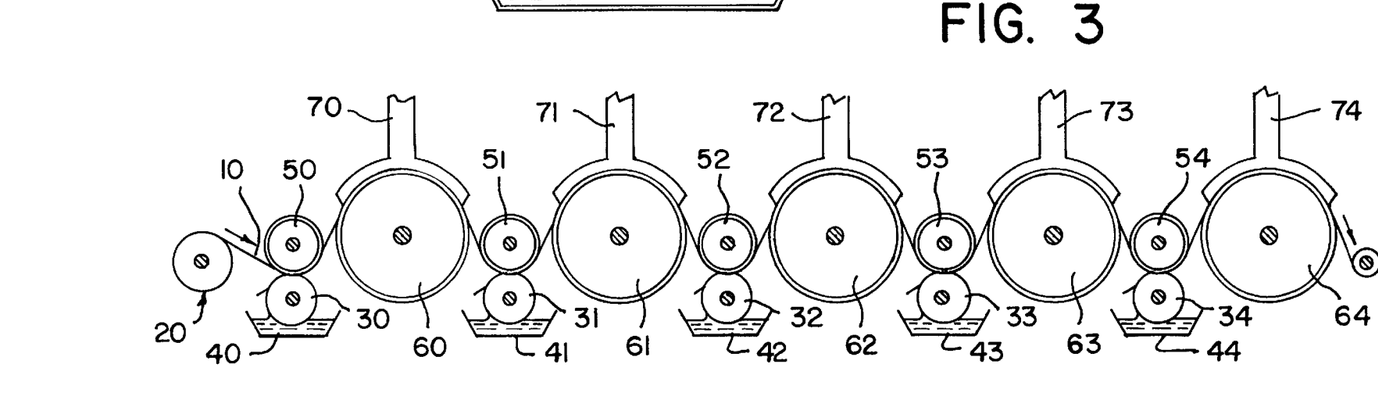
FIG. 3 is a schematic drawing of a direct gravure printing operation involving a set-up consisting of five gravure rolls and five drying rolls.

In FIG. 3 is shown a complete printing facility for carrying out the method of the invention. The facility to which a current collector foil (10) is supplied, comprises a means for feeding current collector (20), five gravure rolls (30–34) onto which primer mixture or electrode paste is applied from the vessels (40–44), and five back-up rolls (50–54). Furthermore, each printing operation is followed by a drying operation, which is carried out using five drying rolls (60–64). Each drying roll is equipped with an exhauster (70–74) for removing evaporated solvents.

In the following examples preparation of primer mixtures according to the invention is illustrated.

EXAMPLE I
Primer Mixture I 10000 g of CL51 from Wiederhold Siebdruckfarben was diluted with 4050 g of 1-butanol.

EXAMPLE II
Primer Mixture II 4,834 g of Alpeprint H/R (Verschnitt C50) from Nordisk Trykfarve Industri, Denmark, 1,310 g of a 50:40:10 by weight mixture of butylacetate, propylene glycol methyl ether acetate and propylene glycol diacetate and 357 g of a cationic dispersing agent were mixed. 15 g of a silicone defoaming agent was added. The mixture was stirred in a dissolver at 1100 rpm. for 3 min. Under stirring at 1100 rpm., 772 g of Shawinigan Black (100% compressed) was added, and the mixture stirred for 15 min. at 4000 rpm. Then 1,100 g of a 50:40:10 by weight mixture of butylacetate, propylene glycol methyl ether acetate and propylene glycol diacetate was added. The viscosity of the final mixture was 27 s as measured with a Ford Cup no. 4.

EXAMPLE III
Primer Mixture III 6,640 g of Alpeprint H/R (Verschnitt C50) from Nordisk Trykfarve Industri, Denmark, 1,800 g of a 50:40:10 by weight mixture of butylacetate, propyleneglycol methyl ether acetate and propylene glycol diacetate and 490 g of a cationic dispersing agent were mixed. 20 g of a silicon defoaming agent was added. The mixture was stirred in a dissolver at 1100 rpm. for 3 min. Under stirring at 1100 rpm., 1,060 g of Shawinigan Black (100% compressed) was added, and the mixture stirred for 15 min. at 4000 rpm. 1,900 g of a 50:40:10 by weight mixture of butylacetate, propylene glycol methyl ether acetate and propylene glycol diacetate were added. The viscosity of the final mixture was 38 s as measured with a Ford Cup no. 4.

In the following examples preparation of anode pastes according to the invention is illustrated.

EXAMPLE IV
Anode Paste A

Under stirring, 757 g of a cationic dispersing agent was dissolved in 4,300 g of a 35:5:30:30 by weight mixture of odourless petroleum 30, odourless petroleum 60, amyl acetate and propylene glycol methyl ether acetate. 3,846 g of 8% of EPDM (ethylene-propylene-diene-polymethylene) in a 90:10 mixture of odourless petroleum 30:odourless petroleum 60 was added without stirring. The resulting mixture was stirred in a dissolver at 1100 rpm. Then 61 g of a mineral oil defoaming agent was added during a period of 4 min followed by 9 min. of stirring. 3,990 g of coke (Lonza R-LIBA-A) was added, and the stirring continued for 8 min. 1,840 g of lampblack (Degussa Lampblack 101) was added, and the stirring continued at 1100 rpm for 8 min. Then the stirring speed was increased to 4000 rpm and kept at this value for 10 min. The stirring was stopped, and 200 g of a 50:5:15:30 by weight mixture of odourless petroleum 30, odourless petroleum 60, propylene glycol diacetate and propylene glycol methyl ether acetate was added. Under stirring at 1100 rpm. another 1,509 g of the 50:5:15:30 by weight mixture of odourless petroleum 30, odourless petroleum 60, propylene glycol diacetate and propylene glycol methyl ether acetate was added. Following 10 min. of stirring, 16 g of a mineral oil defoaming agent was added, along with 700 g of the latter solvent mixture. The viscosity of the resulting mixture was 41 s as measured by a Ford Cup no. 4. Finally, another 250 g of the latter solvent mixture was added. After 120 h of storage, a viscosity of 30 s was measured using a Ford Cup no. 4.

Before printing, 275 g of odourless petroleum 30 and 275 g of amyl acetate, and finally 100 g of a 35:5:30:30 by weight mixture of odourless petroleum 30, odourless petroleum 60, amyl acetate and propylene glycol methyl ether acetate was added to the paste.

EXAMPLE V

Anode Paste B

Under stirring, 645 g of a cationic dispersing agent was dissolved in 3,690 g of a 35:5:30:30 by weight mixture of odourless petroleum 30, odourless petroleum 60, amyl acetate and propylene glycol methyl ether acetate. 3,300 g of 8% of EPDM (ethylene-propylene-diene-polymethylene) in a 90:10 mixture of odourless petroleum 30:odourless petroleum 60 was added without stirring. Then the mixture was stirred in a dissolver at 1100 rpm. for 3 min. 45 g of a mineral oil defoaming agent was added, and the stirring continued for 7 min. Then 3,440 g of coke (Lonza R-LIBA-A) was added followed by 10 min. of stirring. 1,590 g of lampblack (Degussa Lampblack 101) was added, and the stirring continued at 1100 rpm. for 2 min. The stirring speed was then increased to 5000 rpm and kept at this value for 9 min. The stirring was stopped, and following 10 min. of storage, 1,400 g of a 50:5:15:30 mixture by weight of odourless petroleum 30, odourless petroleum 60, propylene glycol diacetate and propylene glycol methyl ether acetate was added. The viscosity of the resulting mixture was 39 s as measured with a Ford Cup no. 4. Finally, another 200 g of the latter solvent mixture was added. After 120 h of storage, the viscosity was 35 s as measured with a Ford Cup no. 4.

Before printing, 275 g of odourless petroleum 30 and 275 g of amyl acetate and finally 100 g of a 35:5:30:30 by weight mixture of odourless petroleum 30, odourless petroleum 60, amyl acetate and propylene glycol methyl ether acetate was added to the paste.

EXAMPLE VI

Anode Paste C

Under stirring, 645 g of a cationic dispersing agent was dissolved in 3,690 g of a 35:5:30:30 by weight mixture of odourless petroleum 30, odourless petroleum 60, amyl acetate and propylene glycol methyl ether acetate. 3,300 g of 8% of EPDM (ethylene-propylene-diene-polymethylene) in a 90:10 mixture of odourless petroleum 30:odourless petroleum 60 was added without stirring. The obtained mixture was stirred in a dissolver at 1100 rpm. for 3 min. 45 g of a mineral oil defoaming agent was added, and the stirring was continued for 7 min. Then, 3,440 g of coke (Lonza R-LIBA-A) was added, and the stirring continued for 10 min. 1,590 g of lampblack (Degussa Lampblack 101) was added, and the stirring continued at 1100 rpm. for 2 min. Then the stirring speed was increased to 5000 rpm and kept at this value for 9 min. The stirring was stopped, and following 10 min. of storage, 1,500 g of a 50:5:15:30 mixture of odourless petroleum 30, odourless petroleum 60, propylene glycol diacetate and propylene glycol methyl ether acetate was added. The viscosity of the resulting mixture was 55 s as measured with a Ford Cup no. 4. Finally, another 200 g of the latter solvent mixture was added. After 120 h of storage, the viscosity was 40 s as measured with a Ford Cup no. 4.

Before printing, 275 g of odourless petroleum 30 and 275 g of amyl acetate and finally 100 g of a 35:5:30:30 by weight mixture of odourless petroleum 30, odourless petroleum 60, amyl acetate and propylene glycol methyl ether acetate was added to the paste.

In the following examples preparation of a cathode paste according to the invention is illustrated.

EXAMPLE VII

Cathode Paste D

Under stirring at 1100 rpm. in a dissolver, 1,580 g of cationic dispersing agent was dissolved in 7,620 g of a 35:5:55:5 by weight mixture of odourless petroleum 30, odourless petroleum 60, butyl acetate and propylene glycol methyl ether acetate. The stirring was stopped, and 9,080 g of lithium manganese oxide spinel was added. Stirring was restarted at 1100 rpm., and 1,720 g of Shawinigan Black (100% compressed) was added. Stirring at 1100 rpm. was continued for 5 min. Eventually, the mixture was milled for 60 min. in a DYNO-MILL KDL-pilot A from Bachofen, Switzerland, which was connected to the dissolver for recirculation, and operated at a counter pressure of 0.4 bar.

9,660 g of the above mixture was mixed with 4,170 g of 8% of EPDM in odourless petroleum 30, and stirred at 1100 rpm. During stirring, 30 g of defoaming agent was added, the stirring being continued for 5 min. 550 g of a 45:5:45:5 mixture by weight of odourless petroleum 30, odourless petroleum 60, butyl acetate and propylene glycol methyl ether acetate was added. The viscosity of the final mixture was 45 s as measured with a Ford Cup no. 4.

In the following examples production of electrode/current collector laminates according to the invention is illustrated.

EXAMPLE VIII

A Production Process Involving a Single Gravure Roll

An electrode/current collector laminate was produced by direct gravure printing of anode paste A using a single gravure roll (cf. FIG. 2) having a circumference of 543 mm. The width of the gravure roll was 800 mm, the central 400 mm of which constituted the engraved part. It had an etched pattern displaying a pitch of 14 $cm^{-1}$, the cell depth being 120 $\mu$m.

The roll was used for printing of an anode paste onto a 600 mm wide aluminium current collector foil onto which a thin protective primer had been deposited in a previous process. The employed printing speed was 17 m/min. The working angles of the blade was kept in the range of 45–50°.

Drying was performed by subjecting the laminate to a temperature of 132° C.

The final laminate showed good adhesion between the current collector and the electrode. The thickness of the electrode layer was 30 $\mu$m and the porosity was approximately 73%, as calculated from weight, thickness and theoretical compact density.

EXAMPLE IX

A Production Process Involving Four Gravure Rolls

An electrode/current collector laminate was produced by direct gravure printing using a gravure roll set-up of four rolls (designated gravure roll 1 to 4), each having a circumference of 543 mm and a width of 800 mm. The width of the engraved central part of gravure roll 1 was 410 mm, whereas the engraved width of gravure rolls 2, 3 and 4 was 400 mm. Gravure roll 1 had an engraved pattern displaying a pitch of 70 $cm^{-1}$, whereas the gravure rolls 2, 3 and 4 had an etched pattern displaying a pitch of 14 $cm^{-1}$. The cell depth of gravure roll 1 was 20 $\mu$m, whereas the cell depth of gravure rolls 2 to 4 was 120 $\mu$m.

The gravure rolls 1 to 4 of the set-up were used for printing of primer mixture I, anode paste A, anode paste B and anode paste C, respectively, using a printing speed of 17 m/min. The working angles of the blades of all four rolls were in the range of 45–50°.

Drying was performed by drying rolls 1 to 4, each of the gravure rolls 1 to 4 being followed by a drying roll of the corresponding number. The operational temperatures of the drying rolls 1 to 4 was 137° C., 146° C., 147° C. and 148° C., respectively.

A current collector foil consisting of a 25 μm thick and 600 mm wide aluminium foil was fed to the set-up at gravure roll 1 and a final laminate having a total thickness of 120 μm and consisting of the aluminium foil containing a primer layer and three electrode layers (each having a thickness of 30 μm, 25 μm and 40 μm, respectively) was removed from the set-up at drying roll 4.

The produced laminate showed good adhesion between the current collector and the electrode. The electrode porosity was approximately 70%, calculated from weight, thickness and theoretical compact density.

EXAMPLE X
A Production Process Involving Five Gravure Rolls

An electrode/current collector laminate was produced by direct gravure printing using a gravure roll set-up of five rolls (cf. FIG. 3), each having a circumference of 543 mm and a width of 800 mm. The width of the engraved central part of rolls 30 and 31 was 410 mm, whereas the engraved width of rolls 32, 33 and 34 was 400 mm. Roll 30 and 31 had an engraved pattern displaying a pitch of 70 cm$^{-1}$, whereas the rolls 32, 33 and 34 had an etched pattern displaying a pitch of 14 cm$^{-1}$. The cell depth of gravure rolls 30 and 31 was 20 μm, whereas the cell depth of gravure rolls 32, 33 and 34 was 120 μm.

The gravure rolls 30 to 34 of the set-up were used for printing of primer mixture II and III, and three layers of cathode paste, respectively, using a printing speed of 17 m/min. The working angles of the blades of all five rolls were in the range of 45–50°.

Drying was performed by drying rolls 60 to 64, each of the gravure rolls 30 to 34 being followed by a drying roll. The operational temperatures of the drying rolls 60 to 64 was 104° C., 105° C., 126° C., 127° C., and 126° C., respectively.

A current collector foil consisting of an aluminium foil was fed to the set-up at gravure roll 30 and the final laminate consisting of the aluminium foil containing two primer layers having a total thickness of 3 μm and three cathode layers having a total thickness of 44 μm was removed from the set-up at drying roll 64.

The produced laminate showed good adhesion between the current collector and the electrode. The electrode porosity was 65%, calculated from weight, thickness and theoretical compact density.

In the following example production of a primer-coated current collector is illustrated.

EXAMPLE XI
A Production Process Involving Two Gravure Rolls

A current collector coated with protective primer layers on both sides was produced by direct gravure printing using a gravure roll set-up of two rolls (designated roll 1 and 2), each having a circumference of 543 mm and a width of 800 mm. The width of the engraved central part of the gravure rolls was 410 mm. The gravure rolls had an engraved pattern displaying a pitch of 70 cm$^{-1}$ and a cell depth of 20 μm.

The gravure rolls 1 and 2 were used for printing of primer mixture II and III, respectively, employing a printing speed of 17 m/min and a working angle of the blades of both rolls in the range of 45–50°.

Printing of protective primer was done on both sides of a 25 μm thick aluminium current collector foil. The production involved a first printing step in which primer mixtures II and III were coated onto a first side of the current collector, followed by drying, and a second printing step in which primer mixtures II and III were coated onto the opposite side of the current collector, followed by drying.

Drying was performed by drying rolls 1 and 2, each of the gravure rolls being followed by a drying roll of the corresponding number. The drying temperature of both drying rolls was 105° C.

The protective 3 μm thick primer layers of the produced primer-coated current collector showed good adhesion to the current collector.

In the following example production of electrochemical cells from the electrode/current collector laminates of the invention is illustrated.

EXAMPLE XII

An electrochemical cell was produced from the anode/current collector laminate of Example VIII and the cathode current collector laminate of Example X. The cell was obtained by sandwiching an electrolyte composed of 1M LiPF$_6$ in propylene carbonate (PC) between said laminates.

The obtained cell displayed a good cyclability, 60% of its initial capacity remaining after 60 cycles.

What is claimed is:

1. A method for the production of an electrode/current collector laminate for an electrochemical device by forming a layer of an electrode paste on at least one side of a current collector foil, said method comprising the steps of:
   a) loading said electrode paste into cells or grooves of a patterned matrice roll;
   b) transferring said electrode paste onto said current collector foil either directly or indirectly via an offset roll; and
   c) drying said electrode paste to provide a layer of at least 20 μm in thickness; wherein said electrode paste comprises particles of an electrode material, solvent and binder, and displays a pseudoplastic viscosity profile.

2. A method according to claim 1, wherein said electrode paste is thixotropic.

3. A method according to claim 1, wherein said viscosity profile is adjusted by use of one or more auxiliary materials selected from the group consisting of dispersing agents, defoaming agents and rheological control agents.

4. A method according to claim 1, wherein said matrice roll is an engraved gravure roll and said electrode paste is transferred onto said current collector foil by a direct gravure printing operation involving a pair of rolls consisting of said engraved gravure roll and a flexible back-up roll defining a nip therebetween, said current collector foil being introduced into said nip.

5. A method according to claim 1, wherein said matrice roll is an engraved gravure roll and said electrode paste is transferred onto said current collector foil by an offset gravure printing operation involving said gravure roll, an offset roll in contact therewith and a flexible back-up roll, said flexible back-up roll and said offset roll defining a nip therebetween, paste from said gravure roll being transferred to said offsets roll and subsequently from said offset roll to said current collector foil by introduction of said current collector foil into said nip.

6. A method according to claim 1, wherein said electrode paste is transferred onto said current collector foil by a flexoprinting operation involving said patterned matrice roll, a rubber offset roll in contact therewith and a flexible back-up roll, said rubber roll and said flexible back-up roll defining a nip therebetween, said paste being transferred from said matrice roll to said rubber offset and subsequently to said current collector foil by introduction of said current collector foil into said nip.

7. A method according to claim 1, wherein said electrode paste is coated onto said current collector to obtain an electrode layer thickness of 20–300 µm in said laminate following drying.

8. A method according to claim 1, wherein said electrode paste has a porosity of 20–80% in said laminate following drying.

9. A method according to claim 1, wherein said electrode paste has a porosity of 30–70% in said laminate following drying.

10. A method according to claim 1, wherein said current collector foil is a metal foil.

11. A method according to claim 10, wherein said current collector foil is selected from the group consisting of aluminum, copper, nickel and stainless steel foils.

12. A method according to claim 1, wherein said current collector foil is coated with a conductive primer prior to coating of said electrode paste.

13. A method according to claim 1, wherein said electrode paste comprises:
   a) 10–60% by weight of electrode material;
   b) 0–20% by weight of an electronically conductive additive;
   c) 1–20% by weight of binder;
   d) 20–88% by weight of solvent; and
   e) 0–20% by weight of auxiliary materials.

14. A method according to claim 13, wherein said electrode paste comprises:
   a) 25–50% by weight of electrode material;
   b) 2–10% by weight of an electronically conductive additive;
   c) 1–10% by weight of binder;
   d) 30–70% by weight of solvent; and
   e) 1–10% by weight of auxiliary materials.

15. A method according to claim 13, wherein said auxiliary materials are selected from the group consisting of dispersing agents, defoaming agents and rheological control agents.

16. A method according to claim 13, which comprises a plurality of electrode coating operations each followed by drying of printed electrode paste and in which at least one of said printing operations provides a layer at least 20 µm thickness.

17. A method according to claim 1, wherein said matrice roll is a gravure roll having a cell depth in the range of 100–300 µm.

18. A method according to claim 17, wherein said cell depth is in the range 120–200 µm.

19. A method according to claim 1, wherein said matrice roll is a gravure roll having a pitch number in the range of 4–20 $cm^{-1}$.

20. A method according to claim 19, wherein said pitch number is in the range 4–15 $cm^{-1}$.

21. A method for the production of an electrode/current collector laminate for an electrochemical device by forming a layer of an electrode paste on at least one side of a current collector foil, said method comprising the steps of:
   a) loading said electrode paste into cells or grooves of a patterned matrice roll;
   b) transferring said electrode paste onto said current collector foil either directly or indirectly via an offset roll; and
   c) drying said electrode paste to provide a layer of at least 20 µm in thickness; wherein said electrode paste comprises particles of an electrode material, solvent and binder, and displays a pseudoplastic viscosity profile and wherein said current collector foil is a conductive polymer foil.

22. A method for the production of an electrode/current collector laminate for an electrochemical device by forming a layer of an electrode paste on at least one side of a current collector foil, said method comprising the steps of:
   a) loading said electrode paste into cells or grooves of a patterned matrice roll, wherein said electrode paste comprises:
      i) 10–60% by weight of electrode material,
      ii) 0–20% by weight of an electronically conductive additive,
      iii) 1–20% by weight of binder,
      iv) 20–88% by weight of solvent, and
      v) 0–20% by weight of auxiliary materials;
   b) transferring said electrode paste onto said current collector foil either directly or indirectly via an offset roll;
   c) drying said electrode paste to provide a layer of at least 20 µm in thickness wherein said electrode paste comprises particles of an electrode material, solvent and binder, and displays a pseudoplastic viscosity profile; and
   d) performing a plurality of paste transferring operations to said current collector foil each followed by drying the electrode paste and in which at least one of said transferring operations provides a layer at least 20 µm in thickness wherein in at least two of said paste transferring steps the paste differs in porosity so as to obtain a porosity profile in said electrode which varies with depth.

* * * * *